United States Patent
He et al.

(10) Patent No.: US 11,613,154 B2
(45) Date of Patent: Mar. 28, 2023

(54) MULTIFUNCTION RESERVOIR FOR A SECONDARY LOOP, CLIMATE CONTROL SYSTEM AND A SECONDARY LOOP CLIMATE CONTROL SYSTEM INCORPORATING THAT MULTIFUNCTION RESERVOIR

(71) Applicant: Ford Global Technologies, LLC, Dearborn, MI (US)

(72) Inventors: Jing He, Novi, MI (US); Loren John Lohmeyer, III, Monroe, MI (US); Angelo Patti, Pleasant Ridge, MI (US); Manfred Koberstein, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/744,943

(22) Filed: May 16, 2022

(65) Prior Publication Data
US 2022/0274457 A1    Sep. 1, 2022

Related U.S. Application Data

(62) Division of application No. 16/700,590, filed on Dec. 2, 2019, now Pat. No. 11,370,264, which is a division of application No. 15/815,112, filed on Nov. 16, 2017, now abandoned.

(51) Int. Cl.
*B60H 1/00* (2006.01)
*F24F 5/00* (2006.01)
(Continued)

(52) U.S. Cl.
CPC ..... *B60H 1/00028* (2013.01); *B60H 1/00492* (2013.01); *B60H 1/00885* (2013.01);
(Continued)

(58) Field of Classification Search
CPC ......... F24F 5/0021; F24F 5/001; F25B 9/008; B60H 2001/3297; B60H 1/00028;
(Continued)

(56) References Cited

U.S. PATENT DOCUMENTS 5,121,324 A   6/1992   Rini et al.
5,425,246 A   6/1995   Bessler
(Continued)

FOREIGN PATENT DOCUMENTS

EP   2179875 B1   1/2016
FR   2936445 A1   4/2010
(Continued)

OTHER PUBLICATIONS

Lemke, Nicholas et al. "Secondary Loop System with PCM Under Different Climatic Conditions," 4th European Workshop on Mobile Air Conditioning, Vehicle Thermal Systems; Torino, Italy, Dec. 1-2, 2011, pp. 1-43.
(Continued)

*Primary Examiner* — Kun Kai Ma
(74) *Attorney, Agent, or Firm* — Vichit Chea; Price Heneveld LLP (57) ABSTRACT

Secondary loop air conditioning and heat pump systems include a reservoir with a capsule holding a phase change material.

10 Claims, 7 Drawing Sheets

(51) Int. Cl.
  *F25D 3/00* (2006.01)
  *F28D 20/02* (2006.01)
  *F25B 25/00* (2006.01)
  *F25D 17/02* (2006.01)
  *B60H 1/32* (2006.01)
  *F25B 9/00* (2006.01)

(52) U.S. Cl.
  CPC ..... *B60H 1/00899* (2013.01); *B60H 1/32281* (2019.05); *F24F 5/001* (2013.01); *F24F 5/0021* (2013.01); *F25B 9/008* (2013.01); *F25B 25/005* (2013.01); *F25D 3/005* (2013.01); *F25D 17/02* (2013.01); *F28D 20/02* (2013.01); *B60H 2001/00928* (2013.01); *B60H 2001/3288* (2013.01); *B60H 2001/3297* (2013.01); *F25B 2400/121* (2013.01)

(58) Field of Classification Search
  CPC ............ B60H 1/00492; B60H 1/00899; B60H 1/32281; B60H 2001/00928; F28D 20/02; Y02E 60/14
  See application file for complete search history.

(56) References Cited

U.S. PATENT DOCUMENTS

| | | | | |
|---|---|---|---|---|
| 5,553,662 | A | * | 9/1996 | Longardner ......... F24F 5/0021 165/902 |
| 6,059,016 | A | * | 5/2000 | Rafalovich ............ F28D 20/02 165/41 |
| 6,230,508 | B1 | | 5/2001 | Baker et al. |
| 8,302,417 | B2 | | 11/2012 | Major et al. |
| 2009/0211732 | A1 | | 8/2009 | Goenka |
| 2009/0314023 | A1 | | 12/2009 | Labaste Mauhe et al. |
| 2010/0179700 | A1 | | 7/2010 | Lorenz et al. |
| 2010/0305435 | A1 | | 12/2010 | Magill |
| 2015/0292775 | A1 | * | 10/2015 | Ma .......................... F28D 20/02 62/115 |
| 2017/0219294 | A1 | | 8/2017 | Longis et al. |
| 2017/0347395 | A1 | | 11/2017 | Ghannam et al. |
| 2018/0031333 | A1 | | 2/2018 | Altman et al. |
| 2018/0162067 | A1 | | 6/2018 | Chang |
| 2018/0283761 | A1 | | 10/2018 | Buttiker |
| 2018/0312035 | A1 | * | 11/2018 | Koberstein ........ B60H 1/00899 |

FOREIGN PATENT DOCUMENTS

| | | | |
|---|---|---|---|
| JP | 2017187188 A | * | 10/2017 |
| WO | 2012016856 A1 | | 2/2012 |

OTHER PUBLICATIONS

Office Action dated Nov. 23, 2018 for U.S. Appl. No. 15/815,112, filed Nov. 16, 2017.

Office Action dated Feb. 13, 2019 for U.S. Appl. No. 15/815,112, filed Nov. 16, 2017.

Office Action dated Aug. 26, 2019 for U.S. Appl. No. 15/815,112, filed Nov. 16, 2017.

* cited by examiner

MULTIFUNCTION RESERVOIR FOR A SECONDARY LOOP, CLIMATE CONTROL SYSTEM AND A SECONDARY LOOP CLIMATE CONTROL SYSTEM INCORPORATING THAT MULTIFUNCTION RESERVOIR

CROSS-REFERENCE TO RELATED APPLICATIONS

This application is a division of U.S. patent application Ser. No. 16/700,590 filed on Dec. 2, 2019, now U.S. Pat. No. 11,370,264, which is a division of U.S. patent application Ser. No. 15/815,112 filed on Nov. 16, 2017, which is abandoned. The aforementioned related applications are hereby incorporated by reference.

FIELD OF THE DISCLOSURE

This document relates generally to the climate control field and, more particularly, to a multifunction reservoir for a secondary loop climate control system as well as to a secondary loop climate control system incorporating that multifunction reservoir and adapted for use in, for example, motor vehicles. Secondary loop climate control systems include both secondary loop air conditioning systems and secondary loop heat pump systems.

BACKGROUND OF THE DISCLOSURE

This document relates to a new and improved multifunction reservoir for a secondary loop climate control system such as a secondary loop air conditioning system or a secondary loop heat pump system. The multifunction reservoir incorporates a capsule containing a phase change material (PCM). As a result, the multifunction reservoir provides a coolant storage function, a surge tank function to prevent pressure spikes, an air ventilation function, and now a thermal storage function without adding a separate component with dedicated thermal storage function to the climate control system.

SUMMARY OF THE DISCLOSURE

In accordance with the purposes and benefits described herein, a new and improved multifunction reservoir is provided for a secondary loop climate control system. That multifunction reservoir comprises a coolant vessel, one or more capsules held in the coolant vessel and a PCM contained in each capsule.

The multifunction reservoir may further include an inlet port and an outlet port on the coolant vessel. In addition, the multifunction reservoir may further include a modulating functionality feature at one of the inlet port and the outlet port in order to allow adjustment of the coolant flow rate. That modulating functionality feature may be a pulse width modulation solenoid valve.

The PCM provided in the capsule may be substantially any phase change material suitable for the intended purpose of thermal storage for a secondary loop climate control system. Dependent upon the temperature range over which the phase transition occurs, PCMs may be divided into three main groups: a) Low temperature materials with phase transition temperature below 15 degree Celsius, for example in air conditioning applications, b) Mid temperature materials with phase transition temperature between 15 to 90 degree Celsius, for example in solar or heat pump applications, and c) High temperature materials with phase transition temperature above 90 degree Celsius, for example in aerospace applications. A low temperature PCM could be salt hydrates such as $LiClO_3 \cdot 3H_2O$, or paraffins such as n-Tetradecane (paraffin 14-carbons) and n-Pentadecane (paraffin 15-carbons). A mid temperature PCM could also be salt hydrates such as $CaCl_2 \cdot 6H_2O$, or paraffins such as n-Docozane (paraffin 22-carbons) and n-Oktacozane (paraffin 28-carbons). A high temperature PCM could be inorganic compounds such as $AlCl_3$ or $NaNO_3$.

The capsule includes an outer wall made preferably from a thermally conductive and stable material. For example, that material may be selected from a group of metallic materials such as aluminum, copper, stainless steel, and carbon steel.

In accordance with an additional aspect, a secondary loop air conditioning system is provided. That secondary loop air conditioning system comprises a refrigerant loop, adapted to circulate a refrigerant between a compressor, a condenser, an expansion device and a chiller, and a coolant loop adapted to circulate a coolant between the chiller, a pump, a first cooler and a reservoir having an integrated phase change material feature.

That reservoir may comprise a coolant vessel and the PCM feature may comprise at least one capsule held in the coolant vessel and a PCM contained in each capsule.

The secondary loop air conditioning system may further include an inlet port and an outlet port in the coolant vessel and a modulating functionality feature at one of the inlet port and the outlet port to adjust the coolant flow rate. That modulating functionality feature may be achieved via a pulse width modulating solenoid valve. The PCM may be substantially any phase change material suitable for low temperature application, e.g. Paraffin 14-carbons. The capsule may include an outer wall made preferably from a thermally conductive and stable material, e.g. metallic materials such as aluminum, copper, stainless steel, and carbon steel.

The secondary loop air conditioning system may further include a second cooler in the coolant loop.

The two coolers may provide an air conditioning function to two different zones of a motor vehicle. In accordance with yet another aspect, a secondary loop heat pump system is provided. That secondary loop heat pump system comprises a first four-way valve, a second four-way valve, a cooling circuit in communication with the first four-way valve and the second four-way valve and a heating circuit in communication with the first four-way valve and the second four-way valve. The cooling circuit includes a cold source, a first reservoir, a first heat exchanger and a first pump. The heating circuit includes a heat source, a second reservoir, a second heat exchanger and a second pump. The first reservoir in the cooling circuit includes a first phase change material feature. The second reservoir in the heating circuit includes a second phase change material feature.

The first reservoir may comprise a first coolant vessel. The first phase change material feature may comprise a first capsule held in the first coolant vessel and a first phase change material contained in the first capsule. The second reservoir may comprise a second coolant vessel. The second phase change material feature may comprise a second capsule held in the second coolant vessel and a second phase change material contained in the second capsule. The first phase change material may be a low temperature PCM such as paraffin 14-carbons. The second phase change material may be a mid-temperature PCM such as paraffin 28-carbons.

In the following description, there are shown and described several preferred embodiments of a multifunction reservoir, a secondary loop air conditioning system incorporating the multifunction reservoir and a secondary loop heat pump system also incorporating the multifunction reservoir. As it should be realized, the multifunction reservoir, the secondary loop air conditioning system and the secondary loop heat pump system are capable of other, different embodiments and their several details are capable of modification in various, obvious aspects all without departing from the multifunction reservoir, secondary loop air conditioning system and secondary loop heat pump system as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the multifunction reservoir, the secondary loop air conditioning system and the secondary loop heat pump system and together with the description serve to explain certain principles thereof.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

Figure 1:
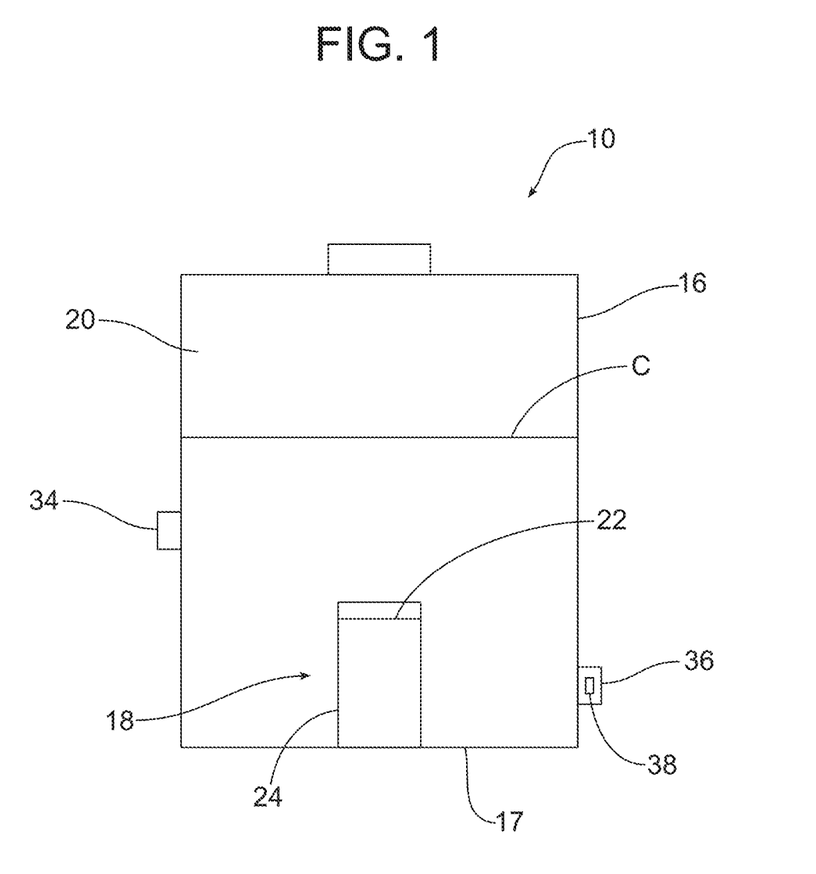
FIG. 1 is a schematic illustration of the multifunction reservoir that is adapted for use in a secondary loop climate control system such as a secondary loop air conditioning system or a secondary loop heat pump system.

Reference is now made to FIG. 1 which schematically illustrates the new and improved multifunction reservoir 10. That multifunction reservoir 10 is particularly adapted for use in a secondary loop climate control system such as the secondary loop air conditioning system 12 illustrated in FIG. 3 and the secondary loop heat pump system 14 illustrated in FIGS. 4 and 5a-5c.

As illustrated in FIG. 1, the multifunction reservoir 10 includes a coolant vessel 16 formed from any appropriate material suited to hold a coolant C for a climate control system while resisting corrosion and providing reliable operation over an extended service life in a motor vehicle environment. The multifunction reservoir 10 also includes a capsule 18 held within the coolant chamber 20 of the coolant vessel 16. A phase change material 22 is provided within the capsule 18.

More specifically, the phase change material 22 may be any PCM suitable for use in a climate control system environment including, for example, paraffins or salt hydrates. That material may be selected dependent upon the operating conditions of the climate control system and phase transition temperature of PCMs. For example, paraffin 14-carbons has a phase change temperature of about 6 degree Celsius and is suitable for use in a multifunction reservoir 10 utilized in the cold coolant loop of a secondary loop climate control system. In contrast, paraffin 28-carbons has a phase change temperature of about 61 degree Celsius making it suitable for use in a multifunction reservoir 10 used in the hot coolant loop of a secondary loop climate control system. The capsule 18 includes an outer wall 24, preferably made from a material that is thermally conductive, stable and resistant to corrosion from the coolant C held in the coolant vessel 16 and the phase change material 22 held in the capsule. For example, the outer wall 24 may be made from metallic materials such as aluminum, copper, stainless steel, and carbon steel.

Figure 2:
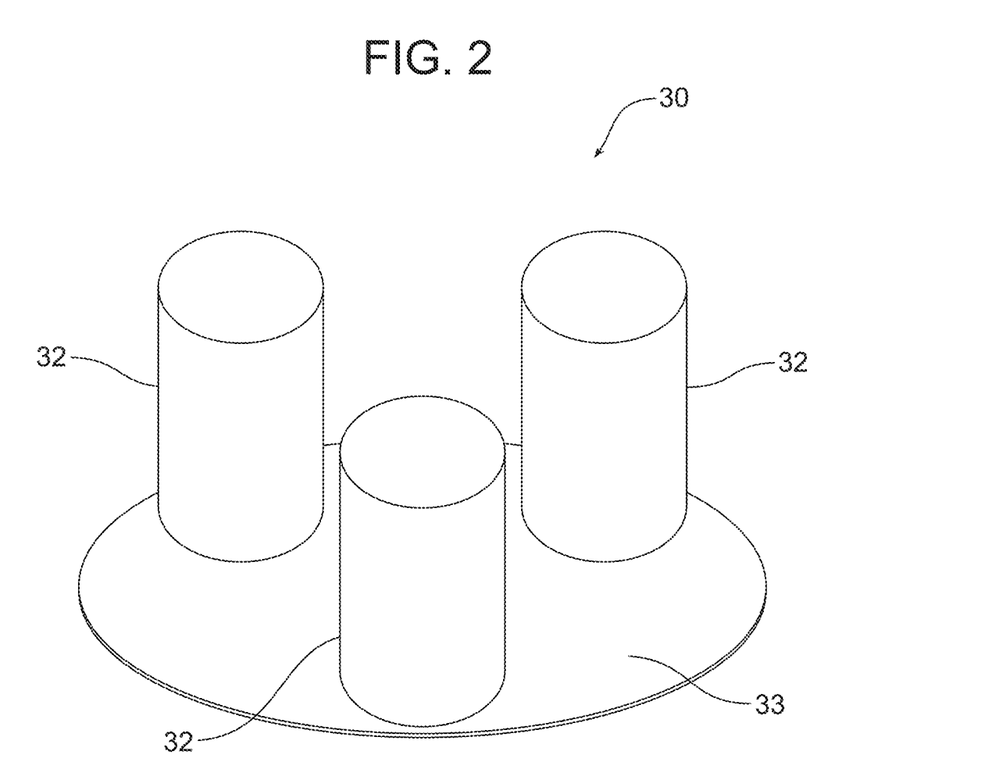
FIG. 2 is a schematic illustration of a capsule insert for the multifunction reservoir.

The multifunction reservoir 10 illustrated in FIG. 1 includes a single capsule 18 holding a phase change material 22. Here it should be noted that more than one capsule 18 may be provided in the coolant chamber 20 of the coolant vessel 16. FIG. 2 illustrates a multi-capsule insert 30 including three capsules 32 all holding a phase change material 22. The three capsules 32 are all fixed to a support or base 33 to maintain spacing between the capsules 32 to accommodate the flow of coolant C between and around the capsules for the most efficient heat exchange. As should be appreciated, the multi-capsule insert 30 may be substituted for the capsule 18 illustrated in FIG. 1. Here it should also be noted that the heat exchange material provided in each of the capsules 32 may be the same or may be different with different phase change temperatures. The PCM selected for each of the capsules 32 is a product of the design parameters and performance requirements required of the secondary loop climate control system as adapted for a given application.

As further illustrated in FIG. 1, the multifunction reservoir 10 includes an inlet port 34 and an outlet port 36 for circulating the coolant C into and out of the coolant vessel 16. In the illustrated embodiment, the inlet port 34 is provided in the coolant vessel 16 near a midline while the outlet port 36 is provided closer to the bottom 17 of the vessel.

A modulating functionality feature 38 may be provided at one of the inlet port 34 and the outlet port 36 in order to adjust the coolant flow rate. In the illustrated embodiment, the modulating functionality feature 38 is provided in the outlet port 36. The modulating functionality feature 38 may take the form of a flow control valve of any appropriate structure including, for example, a pulse width modulating solenoid valve allowing for adjustment of the coolant flow rate from the multifunction reservoir 10 to be achieved via frequency control or position control. More specifically, a correlation can be developed between frequency (or openness) of the valve and a coolant flow rate with the desired flow rate being determined by the required heat exchanger capacity, heat exchanger geometries, air inlet and coolant inlet conditions.

Figure 3:
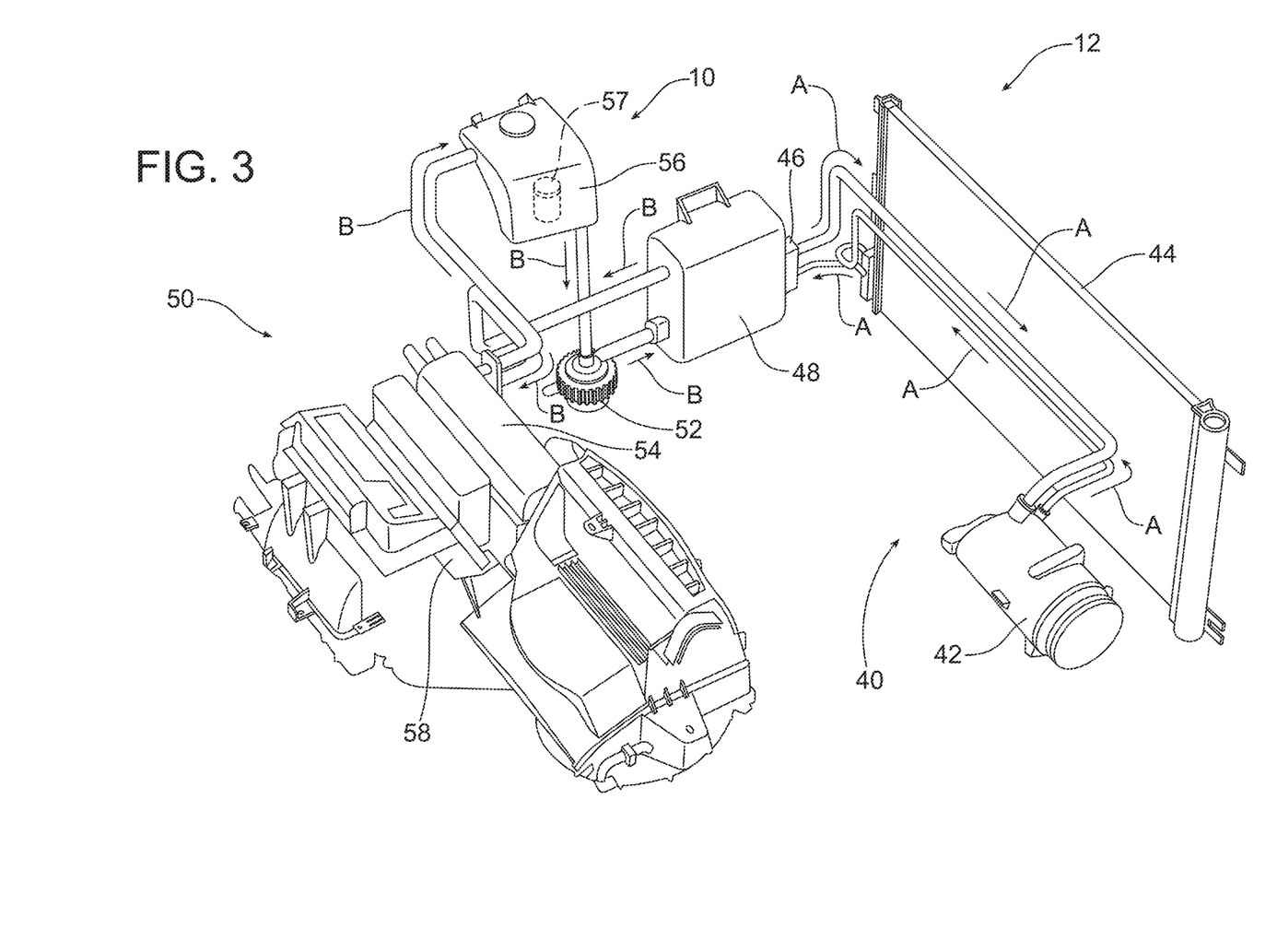
FIG. 3 is a schematic perspective illustration of a secondary loop air conditioning system incorporating a multifunction reservoir of the type illustrated in FIG. 1.

Reference is now made to FIG. 3 illustrating the secondary loop air conditioning system 12. The secondary loop air conditioning system 12 comprises a refrigerant loop 40 adapted to circulate a refrigerant such as R134a, R1234yf, R152a, or R744 ($CO_2$), between a compressor 42, a condenser 44, an expansion device 46 and a chiller 48. Action arrows A illustrate the circulation of the refrigerant through the refrigerant loop 40 by the compressor 42.

The secondary loop air conditioning system 12 also includes a coolant loop 50 adapted to circulate a coolant, such as ethylene glycol and water mixture, or propylene glycol and water mixture, between the chiller 48, a pump 52, a first cooler 54 and a reservoir 56 of a type illustrated in FIG. 1 having an integrated phase change material feature 57, such as a capsule 18 containing a phase change material 22. Action arrows B illustrate the circulation of the refrigerant through the coolant loop 50 by the pump 52.

More specifically, refrigerant is compressed in the compressor 42 to a high temperature, high pressure vapor and enters the condenser 44 where it is cooled through heat exchange with the ambient air circulating over the condenser to low temperature, high pressure refrigerant, preferably in pure liquid. The resulting low temperature, high pressure refrigerant exiting the condenser 44 passes through the expansion device 46 which expands the refrigerant to low temperature, low pressure vapor liquid mixture. The refrigerant mixture then evaporates in the chiller 48 due to heat absorption from the coolant circulated in the coolant loop 50 and exits as low temperature, low pressure vapor. The low temperature, low pressure refrigerant vapor is then returned back to the compressor 42 to again begin the refrigerant cycle.

In the coolant loop 50, coolant from the reservoir 56 is pumped by the pump 52 to the chiller 48 for heat exchange with the refrigerant. Heat is transferred from the coolant to the refrigerant in the chiller 48. Chilled coolant discharged from the chiller 48 is delivered to the cooler 54. Air circulating through the heating, ventilating and air conditioning (HVAC) case 58 of the air conditioning system is in heat exchange relationship with the coolant in the cooler 54. As a result, cooled air is circulated into the passenger compartment of the motor vehicle. Following heat exchange with the air, the coolant is discharged from the cooler 54 and returned to the reservoir 56 including the integrated phase change material feature 57. Here it should be appreciated that the reservoir 56 provides four separate functions: (1) coolant storage, (2) surge tank function to prevent pressure spikes in the coolant loop, (3) ventilation function to discharge air bubbles in the coolant loop to outside environment, and (4) thermal storage through heat exchange with the phase change material 22 of the integrated phase change material feature 57.

Where the reservoir 56 includes a modulating functionality feature 38, the flow rate of coolant from the reservoir 56 to the pump 52 may be controlled in a desired manner.

Figure 4:
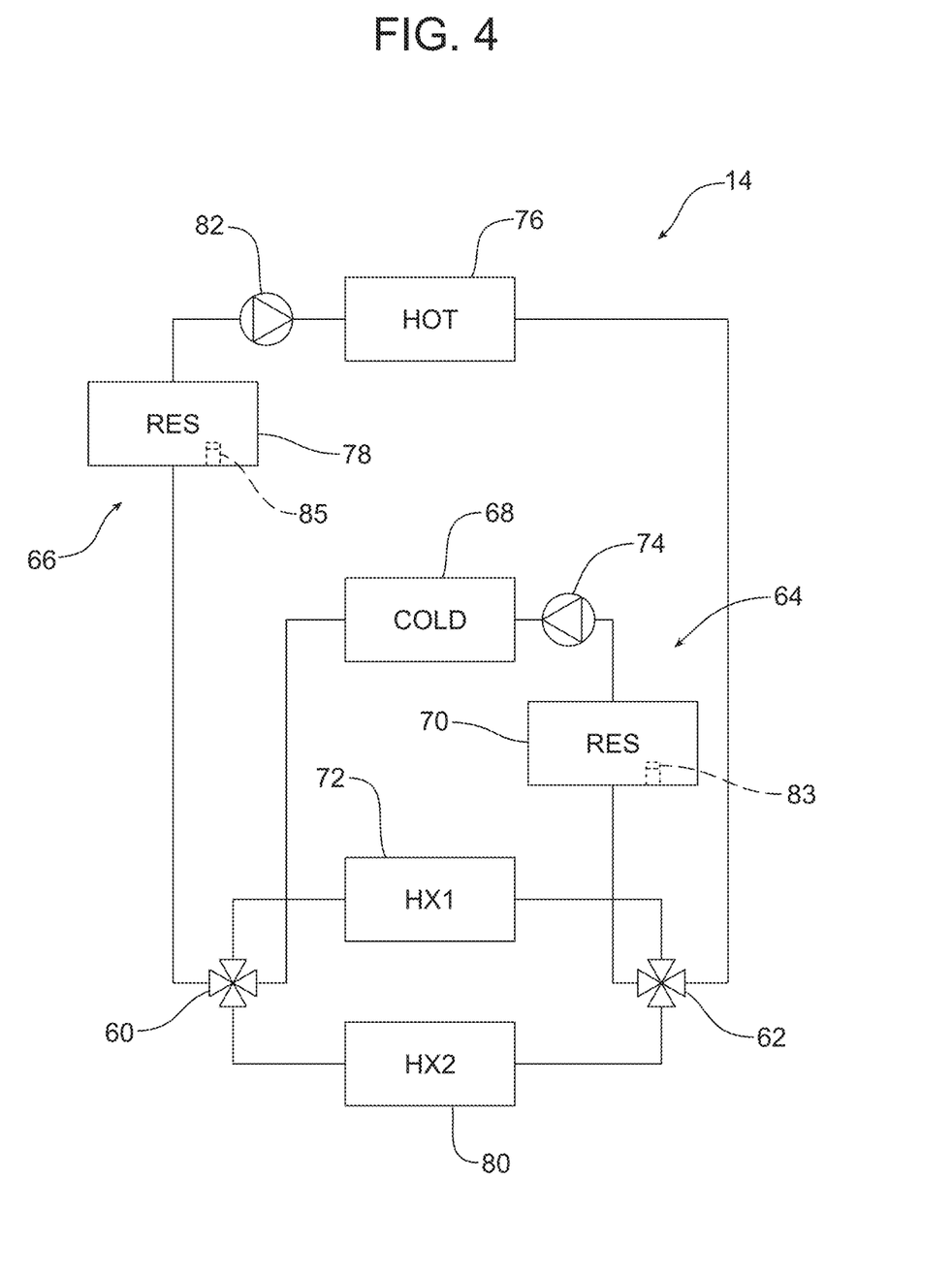
FIG. 4 is a schematic block diagram of a secondary loop heat pump system incorporating two multifunction reservoirs of the type illustrated in FIG. 1: a first multifunction reservoir being provided in the cold coolant loop and a second multifunction reservoir being provided in the hot coolant loop.

Reference is now made to FIG. 4, illustrating one possible embodiment of secondary loop heat pump system 14. Secondary loop heat pump system 14 includes a first four-way valve 60, a second four-way valve 62, a cooling circuit 64 and a heating circuit 66.

More specifically, the cooling circuit 64 is provided in communication with the first four-way valve 60 and the second four-way valve 62. Further, the cooling circuit 64 includes a cold source 68, such as the chiller of a refrigerant circuit, a first reservoir 70 that may be identical to the multifunction reservoir 10 illustrated in FIG. 1, a first heat exchanger 72 to provide heat exchange between the coolant in the cooling circuit 64 and the air being circulated through the passenger cabin of the motor vehicle and a first pump 74. The heating circuit 66 is also provided in communication with the first four-way valve 60 and the second four-way valve 62. The heating circuit 66 includes a heat source 76 for heating the coolant, a second reservoir 78 that may be identical to the multifunction reservoir 10 illustrated in FIG. 1, a second heat exchanger 80 for heat exchange between the coolant and the air being circulated through the passenger compartment of the motor vehicle and a second pump 82 for circulating coolant through the heating circuit 66. The integrated phase change material feature 83 provided in the first reservoir 70 of the cooling circuit 64 incorporates a low temperature PCM appropriate for a cooling circuit. Such a phase change material may be, for example, paraffin 14-carbons. In contrast, the second reservoir 78 in the heating circuit 66 incorporates an integrated phase change material feature 85 having a mid temperature PCM appropriate for a heating circuit such as paraffin 28-carbons.

Figure 5A:
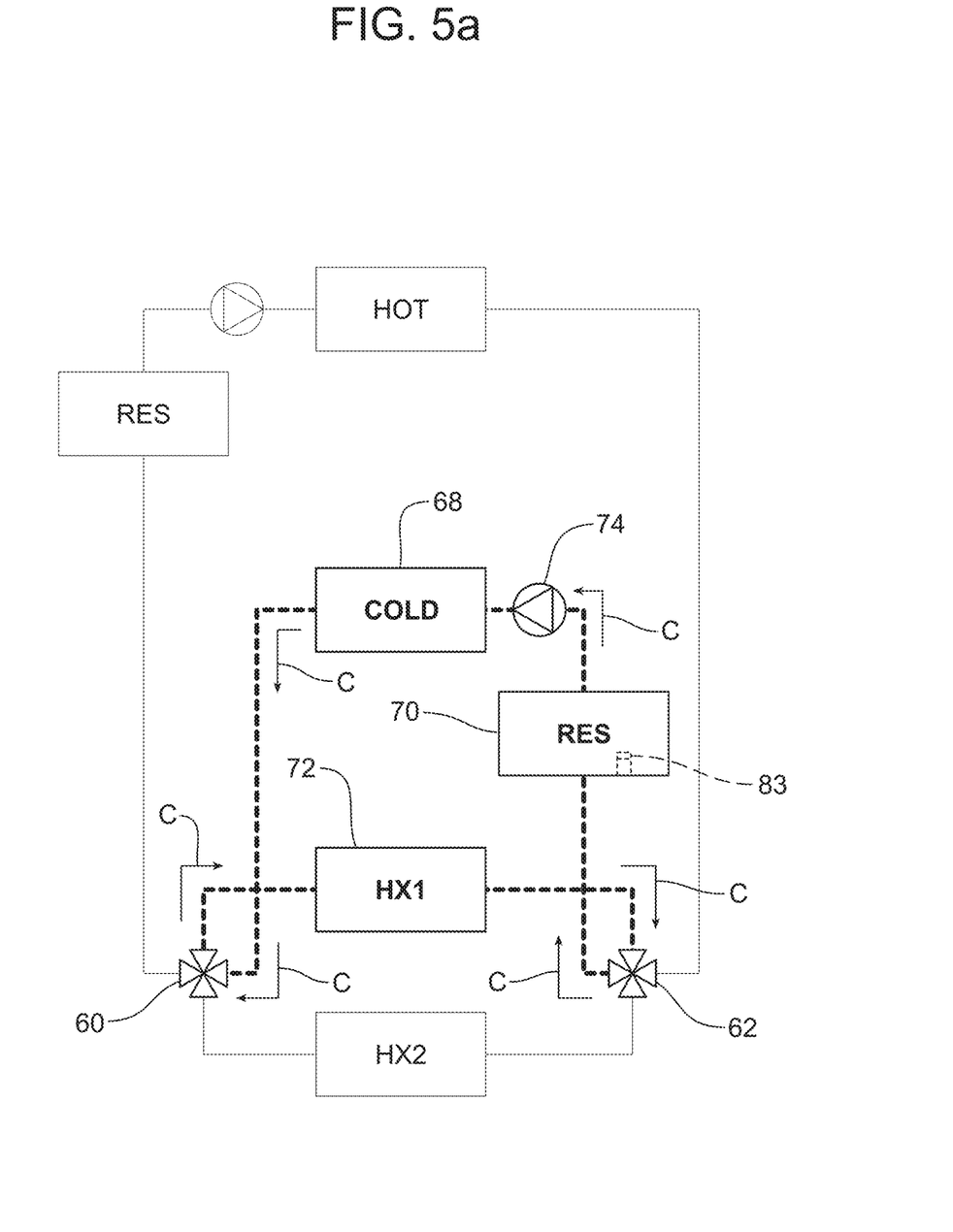
FIG. 5a illustrates the secondary loop heat pump system of FIG. 4 operating in a cooling mode.

FIG. 5a illustrates operation of the secondary loop heat pump system 14 in cooling mode. As illustrated, the first pump 74 pumps coolant from the first reservoir 70 to the cold source 68 in order to remove heat from the coolant which is then pumped from the cold source through the first four-way valve 60 to the first heat exchanger 72. There, heat is removed from the air being circulated into the passenger cabin in order to provide desired cooling to the motor vehicle occupants. The warmed coolant is then pumped through the second four-way valve 62 back to the first reservoir 70 completing one loop through the cooling circuit 64. The coolant continues to move through the cooling circuit 64 in this manner (note action arrows C) until the cooling mode is terminated.

Figure 5B:
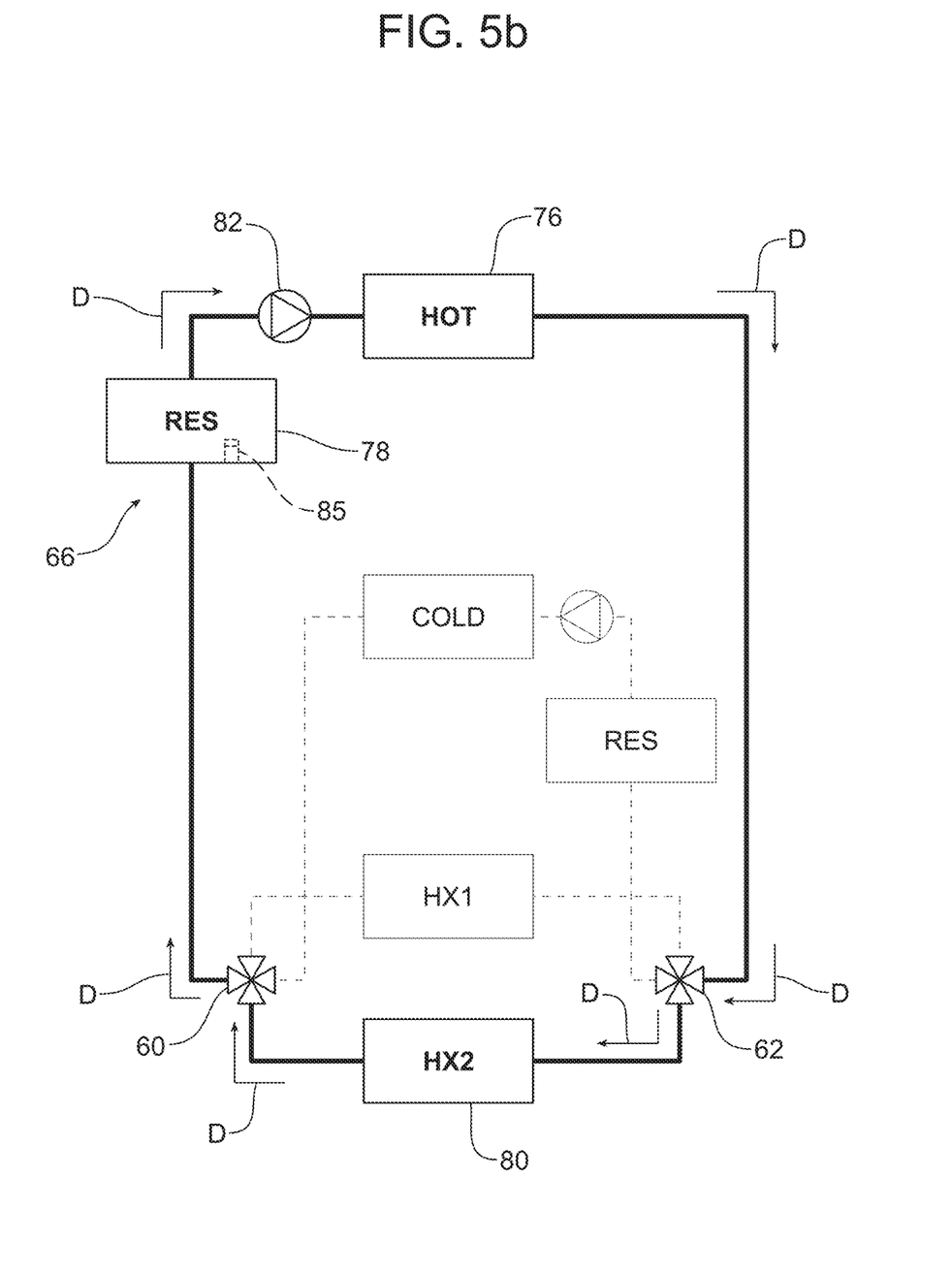
FIG. 5b illustrates the secondary loop heat pump system of FIG. 4 operating in a heating mode.

Reference is now made to FIG. 5b illustrating operation of the secondary loop heat pump system 14 in heating mode. More specifically, coolant from the second reservoir 78 is pumped by the second pump 82 to the heat source 76 for heat exchange. The heated coolant then travels from the heat source 76 through the second four-way valve 62 to the second heat exchanger 80 where the coolant is in heat exchange with the air being circulated through the passenger cabin of the motor vehicle. As a result, that air is heated to warm the occupants of the passenger cabin. The coolant discharged from the second heat exchanger 80 is pumped by the pump 82 through the first four-way valve 60 and then returned to the second reservoir 78 thereby completing one full cycle of the heating circuit 66. This movement of coolant continues in this manner (note action arrows D) until the heating mode is terminated.

Figure 5C:
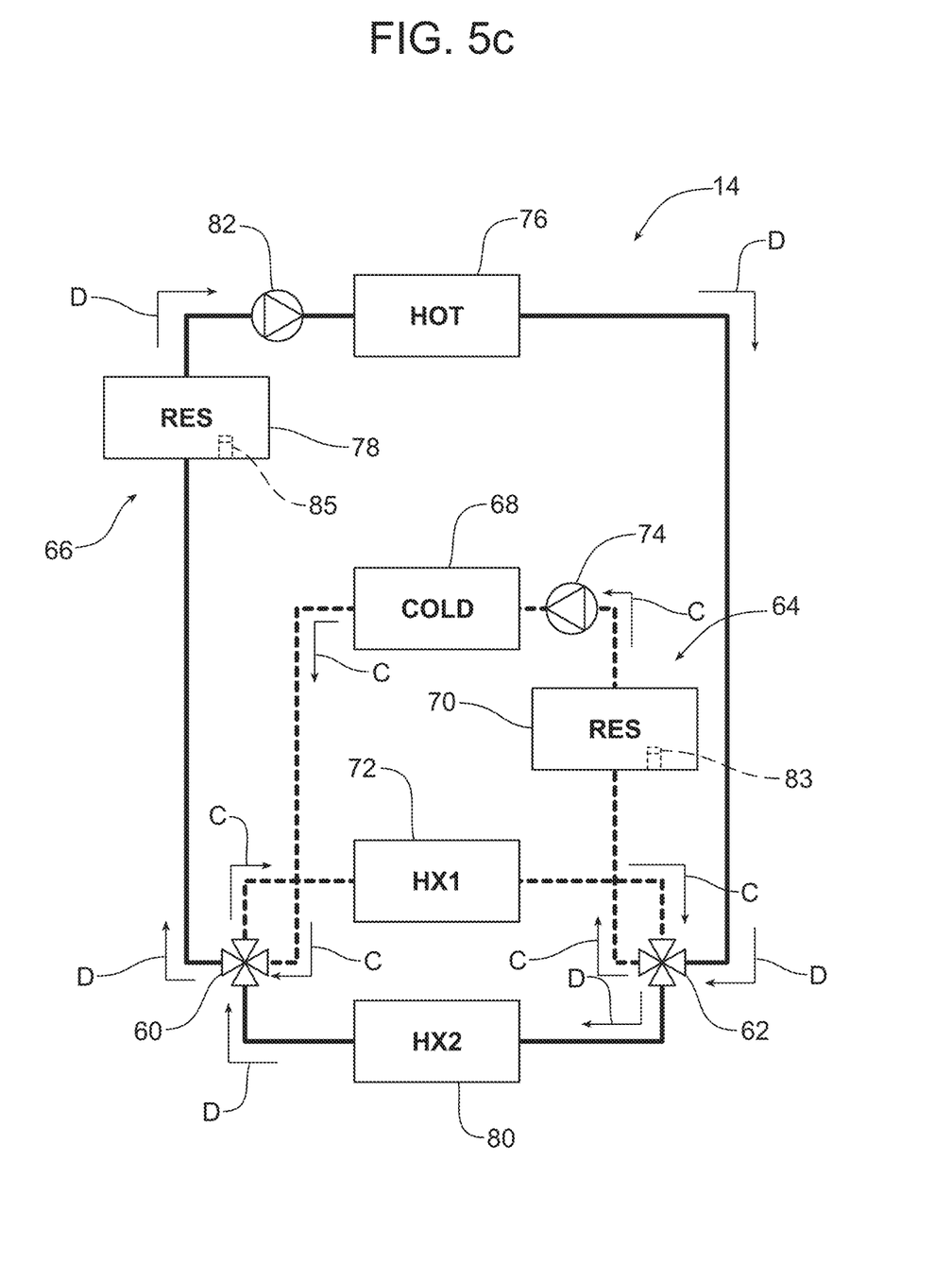
FIG. 5c illustrates the secondary loop heat pump system of FIG. 4 operating in a dehumidification and reheat mode.

Reference is now made to FIG. 5c illustrating operation of the secondary loop heat pump system 14 in dehumidification and reheat mode. Coolant is moving through the cooling circuit 64 in the same manner as that described above in FIG. 5a with respect to the cooling mode (note action arrows C) and coolant is moving through the heating circuit 66 in the same manner as that described above in FIG. 5b with respect to the heating mode (note action arrows D). As a result, air being directed into the passenger compartment of the motor vehicle first comes in heat exchange contact with the first heat exchanger 72. At this point the air is cooled and dehumidified. Next, the air passes in heat exchange relationship through the second heat exchanger 80. As a result the air is heated to provide dry warming comfort to passengers in the passenger compartment. Such air is particularly useful in defogging or deicing a windshield.

The multifunction reservoir 10, secondary loop air conditioning system 12 and secondary loop heat pump system 14 described herein provide a number of benefits and advantages. The multifunction reservoir 10 integrates a phase change material feature 57, 83, 85 into a secondary loop system and, more particularly, the reservoir 56, 70, 78 of the secondary loop system without introducing a new and separate component into the system. As a result, the multifunction reservoir 10, 56, 70, 78 not only provides traditional coolant storage and surge tank functionality but also allows for and provides thermal storage for better comfort and climate control system operation under substantially any foreseeable operating conditions. Where the multifunction reservoir 10 incorporates a modulating functionality feature 38, it is possible to fully control coolant flow while utilizing a fixed speed coolant pump 52, 74, 82 and also eliminating the need for a shutoff valve in the circuit.

The secondary loop heat pump system 14 illustrated in FIG. 4 includes first and second reservoirs 70, 78 having integrated phase change material features 83, 85 providing more efficient and effective operation of both the cooling circuit 64 and the heating circuit 66.

The foregoing has been presented for purposes of illustration and description. It is not intended to be exhaustive or to limit the embodiments to the precise form disclosed. Obvious modifications and variations are possible in light of the above teachings. For example, the capsule 18 may be provided in any desired shape and may be provided in any desired number. The four-way valves 60, 62 may be replaced by multiple one-way, two-way, or three-way valves. All such modifications and variations are within the scope of the appended claims when interpreted in accordance with the breadth to which they are fairly, legally and equitably entitled.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A secondary loop heat pump system, comprising:
    a first four-way valve;
    a second four-way valve;
    a cooling circuit in communication with said first four-way valve and said second four-way valve, said cooling circuit including a cold source, a first reservoir, a first heat exchanger and a first pump; and
    a heating circuit in communication with said first four-way valve and said second four-way valve, said heating circuit including a heat source, a second reservoir, a second heat exchanger and a second pump wherein said first reservoir includes a first capsule holding a first phase change material and said second reservoir includes a second capsule holding a second phase change material.

2. The secondary loop heat pump system of claim 1, wherein (a) said first reservoir comprises a first coolant vessel, wherein the first capsule is held in said first coolant vessel and (b) said second reservoir comprises a second coolant vessel, wherein the second capsule is held in said second coolant vessel.

3. The secondary loop heat pump system of claim 2, wherein said first phase change material has a phase change temperature below 15 degree Celsius in the cooling circuit.

4. The secondary loop heat pump system of claim 2, wherein said second phase change material has phase change temperature between 15 to 90 degree Celsius.

5. The secondary loop heat pump system of claim 2, wherein said first phase change material is paraffin 14-carbons and said second phase change material is paraffin 28-carbons.

6. The secondary loop heat pump system of claim 1, wherein the system is used on a motor vehicle.

7. A secondary loop heat pump system for use on a motor vehicle, comprising:
    a first four-way valve;
    a second four-way valve;
    a cooling circuit in communication with said first four-way valve and said second four-way valve, said cooling circuit including a cold source, a first reservoir, a first heat exchanger and a first pump; and
    a heating circuit in communication with said first four-way valve and said second four-way valve, said heating circuit including a heat source, a second reservoir, a second heat exchanger and a second pump wherein said first reservoir includes a first phase change material feature and said second reservoir includes a second phase change material feature, wherein (a) said first reservoir comprises a first coolant vessel and said first phase change material feature comprises a first capsule held in said first coolant vessel and a first phase change material in said first capsule and (b) said second reservoir comprises a second coolant vessel and said second phase change material feature comprises a second capsule held in said second coolant vessel and a second phase change material in said second capsule.

8. The secondary loop heat pump system of claim 7, wherein said first phase change material has a phase change temperature below 15 degree Celsius in the cooling circuit.

9. The secondary loop heat pump system of claim 7, wherein said second phase change material has phase change temperature between 15 to 90 degree Celsius.

10. The secondary loop heat pump system of claim 7, wherein said first phase change material is paraffin 14-carbons and said second phase change material is paraffin 28-carbons.

* * * * *